(12) United States Patent
Choi et al.

(10) Patent No.: US 9,545,834 B2
(45) Date of Patent: Jan. 17, 2017

(54) LOCKING DEVICE FOR VEHICLE SLIDING DOOR

(71) Applicants: HYUNDAI MOTOR COMPANY, Seoul (KR); KWANGJIN CO., LTD., Asan-si, Chungcheongnam-do (KR)

(72) Inventors: Jae Hong Choi, Hwaseong-si (KR); YoungBae Gong, Asan-si (KR)

(73) Assignees: HYUNDAI MOTOR COMPANY, Seoul (KR); Kwangjin Co., Ltd., Asan-si, Chungcheongnam-do (KR)

( * ) Notice: Subject to any disclaimer, the term of this patent is extended or adjusted under 35 U.S.C. 154(b) by 0 days.

(21) Appl. No.: 14/737,367

(22) Filed: Jun. 11, 2015

(65) Prior Publication Data

US 2016/0130844 A1     May 12, 2016

(30) Foreign Application Priority Data

Nov. 6, 2014   (KR) .................. 10-2014-0153530

(51) Int. Cl.
*E05D 15/10*     (2006.01)
*B60J 5/06*      (2006.01)

(52) U.S. Cl.
CPC .............. *B60J 5/06* (2013.01); *E05D 15/1081* (2013.01); *E05D 2015/1086* (2013.01); *E05Y 2201/22* (2013.01); *E05Y 2201/64* (2013.01); *E05Y 2900/531* (2013.01)

(58) Field of Classification Search
CPC .......... E05B 83/40; E05B 85/24; E05C 3/124; B60J 5/047; B60J 5/06
See application file for complete search history.

(56) References Cited

U.S. PATENT DOCUMENTS

| | | | | |
|---|---|---|---|---|
| 3,935,674 A | * | 2/1976 | Williams | E05D 15/1081 49/212 |
| 6,183,039 B1 | * | 2/2001 | Kohut | E05D 15/1081 296/146.12 |
| 7,000,977 B2 | * | 2/2006 | Anders | E05D 15/48 296/146.12 |
| 7,717,493 B2 | * | 5/2010 | Plavetich | B60J 5/06 296/146.11 |
| 7,954,880 B2 | * | 6/2011 | Kunishima | B60J 5/06 292/241 |
| 8,096,606 B2 | * | 1/2012 | Hanaki | E05D 15/101 296/146.11 |
| 8,353,555 B2 | * | 1/2013 | Boettcher | B60J 5/06 296/146.12 |

(Continued)

FOREIGN PATENT DOCUMENTS

| | | |
|---|---|---|
| JP | 7-009631 U | 2/1995 |
| KR | 10-2005-0034470 A | 4/2005 |

*Primary Examiner* — Katherine Mitchell
*Assistant Examiner* — Abe Massad
(74) *Attorney, Agent, or Firm* — McDermott Will & Emery LLP (57) ABSTRACT

A locking device for a vehicle sliding door comprises a rail mounted on the vehicle sliding door; a central support structure coupled to the rail and mounted on the vehicle body and configured to connect the vehicle sliding door to the vehicle body and to allow the vehicle sliding door to pivot and slide; and a hook disposed on the central support structure and configured to lock the central support structure with respect to the rail according to a movement of the vehicle sliding door.

7 Claims, 9 Drawing Sheets

(56) References Cited

U.S. PATENT DOCUMENTS

| 8,713,852 B2* | 5/2014 | Choi | E06B 3/46 |
| | | | 296/146.11 |
| 9,050,878 B2* | 6/2015 | Hendren | B60J 5/06 |
| 2013/0205668 A1 | 8/2013 | Neag et al. | |

* cited by examiner

LOCKING DEVICE FOR VEHICLE SLIDING DOOR

CROSS-REFERENCE TO RELATED APPLICATION

This application claims the benefit of priority to Korean Patent Application No. 10-2014-0153530 filed in the Korean Intellectual Property Office on Nov. 6, 2014, the entire content of which is incorporated herein by reference.

TECHNICAL FIELD

The present disclosure relates to a locking device for a vehicle sliding door. More particularly, the present disclosure relates to a locking device for a vehicle sliding door for locking or releasing a rail installed on a vehicle sliding door that can slide forward and rearward in the longitudinal direction of a vehicle.

BACKGROUND

In general, a vehicle is provided with a passenger compartment of a predetermined size so a driver and accompanying passengers can board the vehicle. Doors for opening and closing the passenger compartment are installed on the vehicle body.

In a passenger vehicle, the doors for opening and closing the passenger compartment may have a front door disposed toward the front of the longitudinal direction of the vehicle and a rear door disposed toward the rear of the longitudinal direction of the vehicle. The front door and the rear door are installed on the vehicle body so as to be rotated conventionally via a hinge.

In a van which many people can board, the doors for opening and closing the passenger compartment open and close the passenger compartment with sliding movement forward and rearward along the longitudinal direction of the van.

The sliding-type doors for opening and closing the passenger compartment of the van open the passenger compartment by moving rearward along the longitudinal direction of the van and close the passenger compartment by moving forward along the longitudinal direction of the van. This has the advantage of needing less space to open and close the doors than a hinge-type door, and also one can fully open the door in smaller opening and closing spaces.

However, according to the prior art, in the sliding-type doors for opening and closing the passenger compartment, it was necessary that the structure that locked the sliding-type doors and the rails thereof be smoothly pivoted, so that the structure could release the sliding-type doors and the sliding-type doors could slide smoothly after the rotation movement thereof.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a locking device for a vehicle sliding door having the advantages of locking a vehicle sliding door to prevent the vehicle sliding door from sliding back and forth in the longitudinal direction of the vehicle. The vehicle sliding door is pivoted outwardly in the width direction of the vehicle in order to be opened, and the present disclosure provides for a locking device that releases the vehicle sliding door and the rail thereof in order for the vehicle sliding door to be slid smoothly back and forth in the longitudinal direction of the vehicle after the vehicle sliding door has completely pivoted.

A locking device for a vehicle sliding door according to an exemplary embodiment of the present inventive concept may include a rail mounted on the vehicle sliding door; a central support structure coupled to the rail and mounted on the vehicle body and configured to connect the vehicle sliding door to the vehicle body and to allow the vehicle sliding door to pivot and slide; and a hook disposed on the central support structure and configured to lock the central support structure with respect to the rail according to a movement of the vehicle sliding door.

The rail may include a rail body having a substantially rectangular shape; an upper guide rail that extends along an upper edge of the rail body; and a lower guide rail that extends along a lower edge of the rail body, wherein the upper guide rail and the lower guide rail may protrude from the rail body in a direction perpendicular to the rail body.

The upper guide rail and the lower guide rail may each have a circular cross-section.

The central support structure may include a central slider disposed on the rail; a slider body of a substantially rectangular block shape coupled to the upper guide rail and lower guide rail; and rollers rotatably installed in the slider body and configured to roll along the upper lower guide rail or the lower guide rail.

The central slider may be configured as an upper pair of central sliders disposed on the upper guide rail and a lower pair of central sliders disposed on the lower guide rail, and the upper pair of central sliders and the lower pair of central sliders may be mounted on a central slider mounting bracket.

The central support structure may include a vehicle body mounting bracket mounted on the vehicle body; and a swing arm having a first end rotatably coupled to the vehicle body mounting bracket and a second end rotatably coupled to the central slider mounting bracket.

The swing arm may include an upper swing arm disposed on an upper portion of the swing arm; a lower swing arm disposed on a lower portion of the swing arm; and two flanges of a substantially rectangular shape each connecting the upper swing arm and the lower swing arm, one of the flanges having a pressing edge for pressing down and pivoting the hook.

A first penetrating assembling hole may be formed on the upper swing arm; a second penetrating assembling hole may be formed on the lower swing arm; and two engaging flanges may be disposed on the central slider mounting bracket and rotatably coupled to the upper swing arm and the lower swing arm.

The vehicle body mounting bracket may have a substantially "U"-shaped cross-section and comprise an upper surface flange, a lower surface flange, and a side surface flange connecting the upper surface flange and the lower surface flange; the side surface flange may be mounted to the vehicle body; and the swing arm may be disposed between the upper surface flange and the lower surface flange and rotatably engaged with them via pins.

An elastic spring may be disposed between the vehicle body mounting bracket and the swing arm, the elastic spring returning the swing arm to a swing arm original position after the swing arm has been pivoted.

The hook may include a hook body; a hanger formed on an end of the hook body and configured to be releasably attached to the rail; and a boss that protrudes from the hook body, wherein pins may be inserted into the boss; and the hook may be rotatably coupled to the swing arm and the central slider mounting bracket.

An elastic spring may be configured to return the hook to a hook original position.

According to an exemplary embodiment of the present inventive concept, a locking device for a vehicle sliding door provides for the vehicle sliding door to be stably supported while being pulled and pivoted outwardly in the width direction of the vehicle in order to open a door opening. Furthermore, after the outward pivoting movement of the vehicle sliding door is completed, the vehicle sliding door and the rail thereof may be smoothly released in order for the vehicle sliding door to be easily slid back and forth in the longitudinal direction of the vehicle.

Accordingly, the pivoting movement of the vehicle sliding door may be smoothly achieved, and the slide movement thereof along the longitudinal direction of the vehicle may be easily carried out.

DETAILED DESCRIPTION

Hereinafter, an exemplary embodiment of the present inventive concept will be described in detail with reference to the accompanying drawings.

Figure 1:
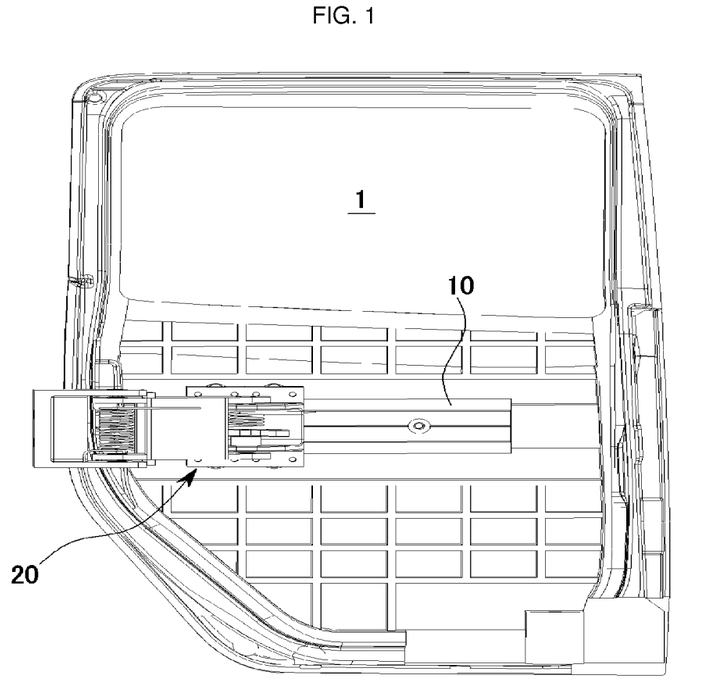
FIG. 1 is a perspective view for showing a state where a vehicle sliding door and a rail thereof are locked to and supported by a vehicle body through a locking device for a vehicle sliding door according to an exemplary embodiment of the present inventive concept.

Referring to FIG. 1, a locking device for a vehicle sliding door according to an exemplary embodiment of the present inventive concept may lock or release a vehicle sliding door 1, which may open or close a door opening formed on a vehicle body, with respect to the vehicle body.

A rail 10 may be integrally fixedly mounted on the vehicle sliding door 1.

A central support structure 20 that is coupled to the rail 10 and also coupled to the vehicle may be further included.

The locking device for the vehicle sliding door may be installed to the central support structure 20 and may rotatably lock the vehicle sliding door 1 and the rail 10 thereof to the vehicle body or release them from the vehicle body to be slid back and forth in the longitudinal direction of the vehicle.

FIG. 1 shows a state where the vehicle sliding door 1 is closed and the door opening is sealed.

Figure 2:
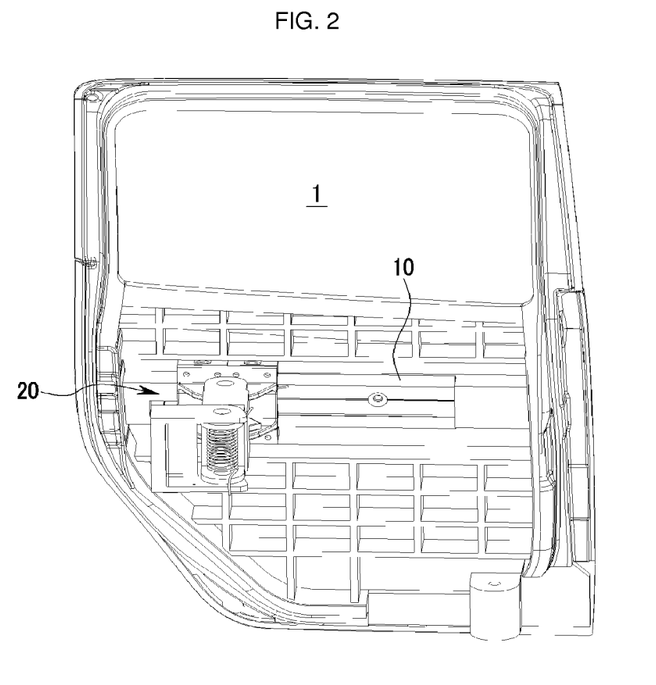
FIG. 2 is a perspective view for showing a state where the vehicle sliding door and the rail thereof are released from the locking device for the vehicle sliding door according to an exemplary embodiment of the present inventive concept and then moved forward in the longitudinal direction of the vehicle.

FIG. 2 shows a state where the vehicle sliding door 1 is released from the locking device, and may move forward in the longitudinal direction of the vehicle to open a part of the door opening.

Figure 3:
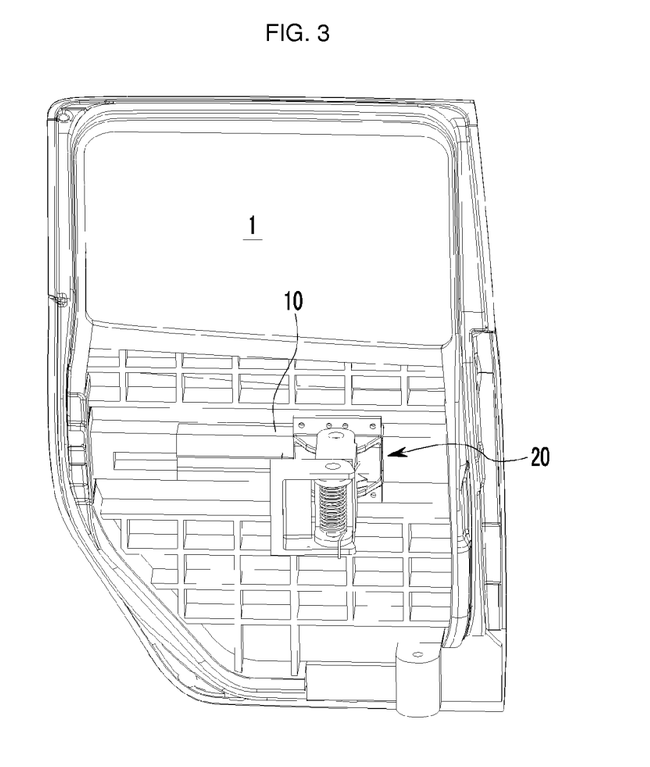
FIG. 3 is a perspective view for showing a state where the vehicle sliding door and the rail thereof are released from the locking device for the vehicle sliding door according to an exemplary embodiment of the present inventive concept and then moved forward in the longitudinal direction of the vehicle to fully open a door opening formed on the vehicle body.

FIG. 3 shows a state where the vehicle sliding door 1 has been released from the locking device, and moved forward in the longitudinal direction of the vehicle to fully open the door opening.

The rail 10 may be mounted on the vehicle sliding door in a middle region of a height direction of the vehicle on the inner surface facing the passenger compartment and may extend straightly back and forth in the longitudinal direction.

Figure 4:
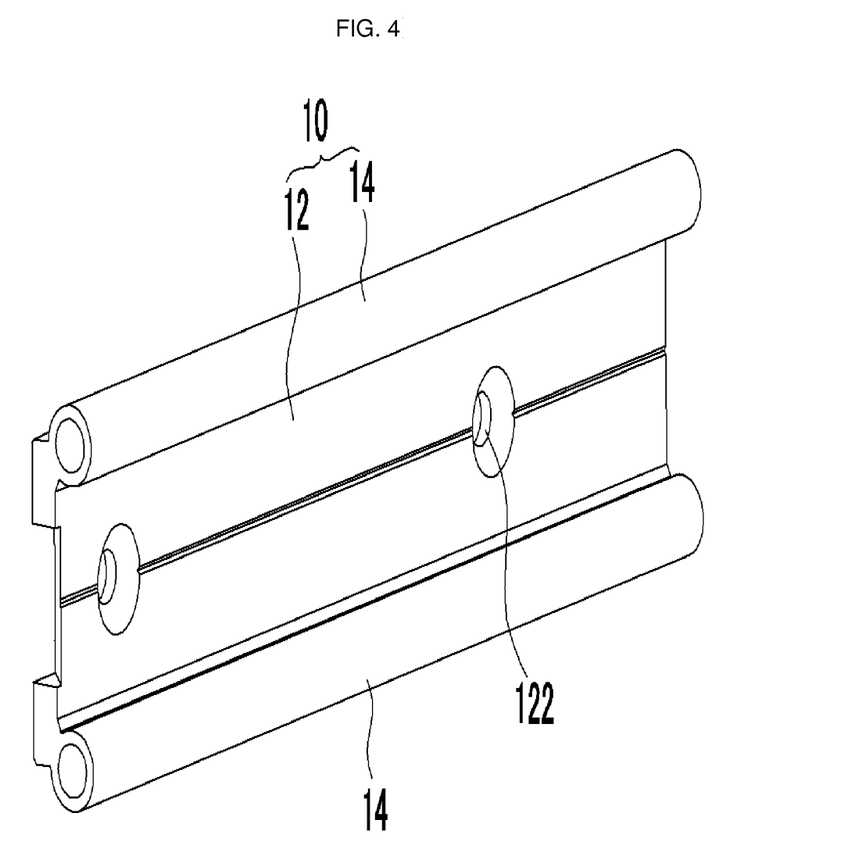
FIG. 4 is a perspective view of the rail according to an exemplary embodiment of the present inventive concept.

Referring to FIG. 4, the rail 10 may include a rail body 12 of a substantially rectangular plate shape and two guide rails 14 formed to extend in the longitudinal direction along both upper and lower edges of the rail body 12 and may protrude in a direction perpendicular to the rail body 12.

The guide rail 14 may be formed with a circular cross-section.

Two penetrating mounting holes 122 may be formed on the rail body 12 at a predetermined interval in the longitudinal direction.

The two mounting holes 122 may be used to mount the rail body 12 on the vehicle sliding door 1 via bolts.

Figure 5:
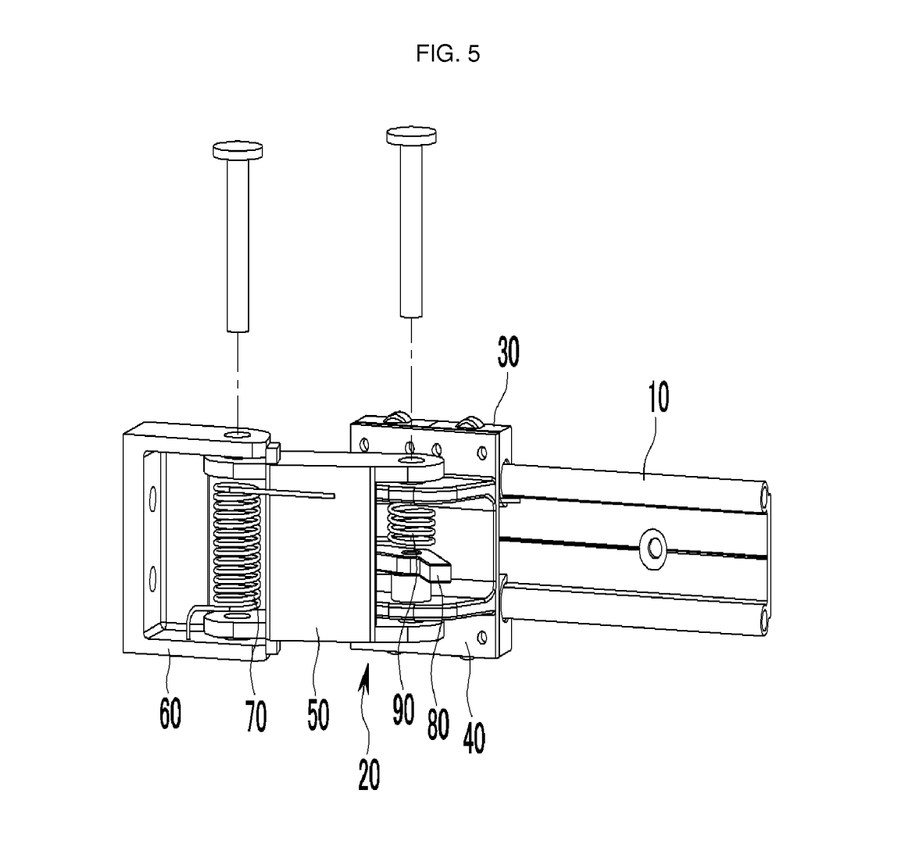
FIG. 5 is a perspective view of a central support structure according to an exemplary embodiment of the present inventive concept.
Figure 6:
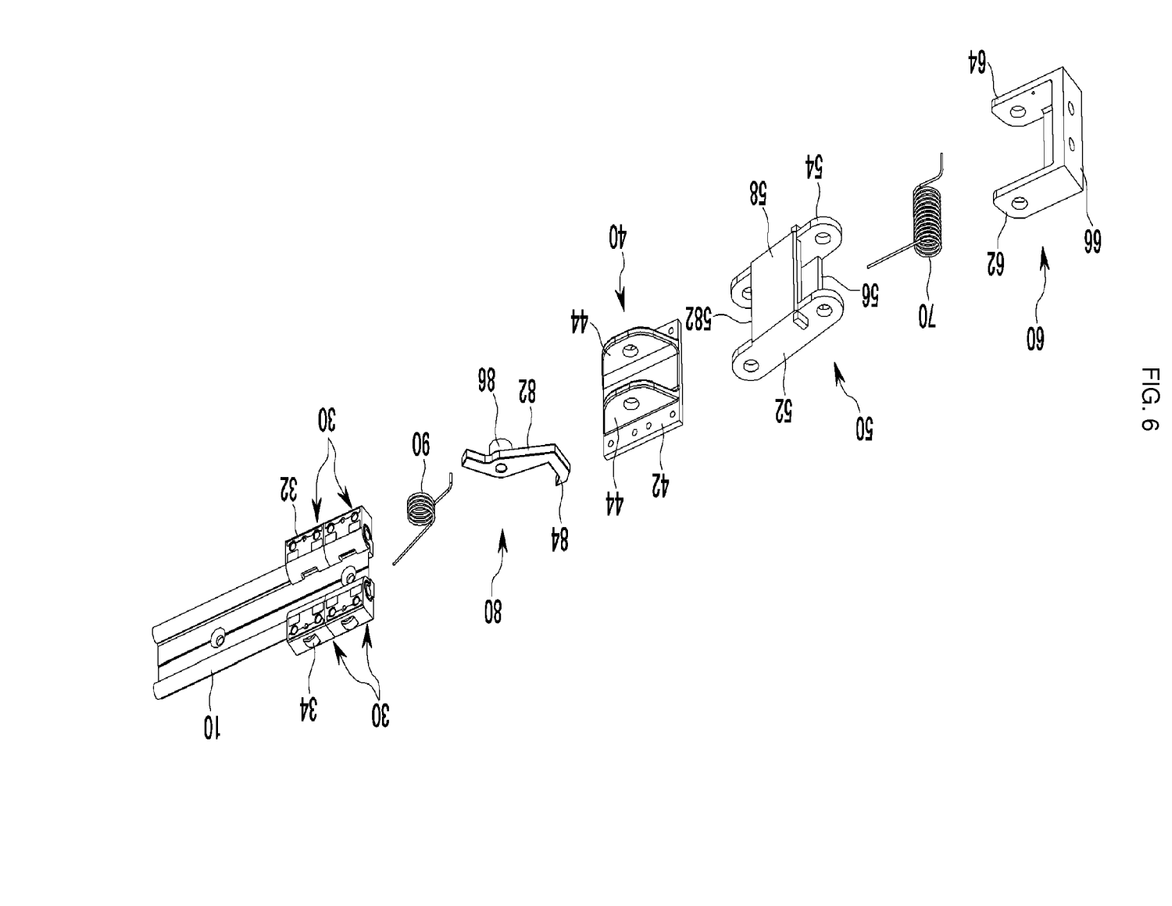
FIG. 6 is an exploded perspective view of the central support structure according to an exemplary embodiment of the present inventive concept.

Referring to FIGS. 5 and 6, one end of the central support structure 20 may be rotatably engaged with the rail 10, the other end thereof is fixedly mounted to the vehicle body so that the vehicle sliding door 1 and the rail 10 may be connected to the central support structure 20 to be able to relatively pivot and slide relative to the vehicle body.

The central support structure 20 may include a central slider 30, a central slider mounting bracket 40, a swing arm 50, and vehicle body mounting bracket 60.

The central slider 30 may be engaged with the rail 10 to be able to move along the rail 10, one end of the swing arm 50 may be engaged with the central slider mounting bracket 40 via pins, the other end of the swing arm 50 may be engaged with the vehicle body mounting bracket 60 via pins, and the vehicle body mounting bracket 60 may be fixedly mounted on the vehicle body.

The central slider 30 may be configured as an upper pair disposed on an upper guide rail 14 and a lower pair disposed on a lower guide rail 14, and the upper pair and the lower pair of the central slider 30 may be mounted on the central slider mounting bracket 40 to be integrally moved.

The central slider 30 may be formed with a substantially rectangular block shape and engaged with a guide rail 14 of the central rail 10 such that the guide rail 14 is inserted into the central slider 30. The central slider 30 may include a slider body 32 with an assembling hole for coupling to the central slider mounting bracket 40 and a roller 34 rotatably installed in the slider body 32 such that the roller 34 is inserted into the slider body 32 to roll along the guide rail 14 with surface contact to the guide rail 14 of the central rail 10.

The central slider mounting bracket 40 may include a central slider mounting bracket body 42 of a substantially rectangular plate shape engaged with each assembling hole formed on the slider body 32 of the central slider 30 and two engaging flanges 44 that protrude in a perpendicular direction from the central slider mounting bracket body 42.

An assembling hole may be formed on each of the two engaging flanges 44.

The swing arm 50 may include an upper swing arm 52 and a lower swing arm 54 disposed on an upper portion and on a lower portion of the vertical direction, respectively, and two flanges 56 and 58 of a substantially rectangular plate shape connecting both edges of the upper swing arm 52 and the lower swing arm 54.

A pressing edge 582 for pressing a hook described below and pivoting it may be formed at the one side flange 58.

Penetrating assembling holes may be formed on one edges of the upper swing arm 52 and the lower swing arm 54, respectively.

Between the upper swing arm 52 and the lower swing arm 54 may be inserted the two engaging flanges 44 of the central slider mounting bracket 40, and thus the swing arm 50 may be engaged with the central slider mounting bracket 40 to be able to pivot using pins inserted into each of the assembling hole of the upper swing arm 52 and the lower swing arm 54 and each of the assembling hole of the engaging flanges 44 of the central slider mounting bracket 40.

The vehicle body mounting bracket 60 may be formed with a substantially "U"-shaped cross-section having an upper surface flange 62, a lower surface flange 64, and a side surface flange 66 connecting the upper surface flange 62 and the lower surface flange 64.

One or more penetrating assembling holes may be formed on the side surface flange 66 by so that the vehicle body mounting bracket 60 may be fixedly mounted on the vehicle body through the penetrating assembling holes.

A penetrating assembling hole may be formed on the upper surface flange 62 and the lower surface flange 64, respectively, so that a part of the swing arm 50 may be inserted between the upper surface flange 62 and the lower surface flange 64 and rotatably engaged with them via pins.

In order for the swing arm 50 to be returned to its original position after being pivoted to the vehicle body, an elastic spring 70 may be installed between the vehicle body mounting bracket 60 and the swing arm 50.

That is, one end of the elastic spring 70 may be connected to the vehicle body mounting bracket 60 and the other end thereof may be connected to the swing arm 50, such that the elastic spring 70 is twisted or released depending on the rotational movement of the swing arm 50.

A hook 80 may be interposed and rotatably mounted at the engaging portion between the swing arm 50 and the central slider mounting bracket 40.

The hook 80 may be rotatably engaged with the swing arm 50 and the central slider mounting bracket 40 via pins.

The hook 80 may include a hook body 82 through which the pins penetrate, a hanger 84 formed at an end portion of the hook body 82 and a boss 86 formed protrude from the hook body 82 and into which the pins are inserted. An elastic spring 90 may be provided in order to return the hook 80 to its original position after it is rotated and stably maintain a state where the hook 80 is locked to the central rail 10.

Figure 7:
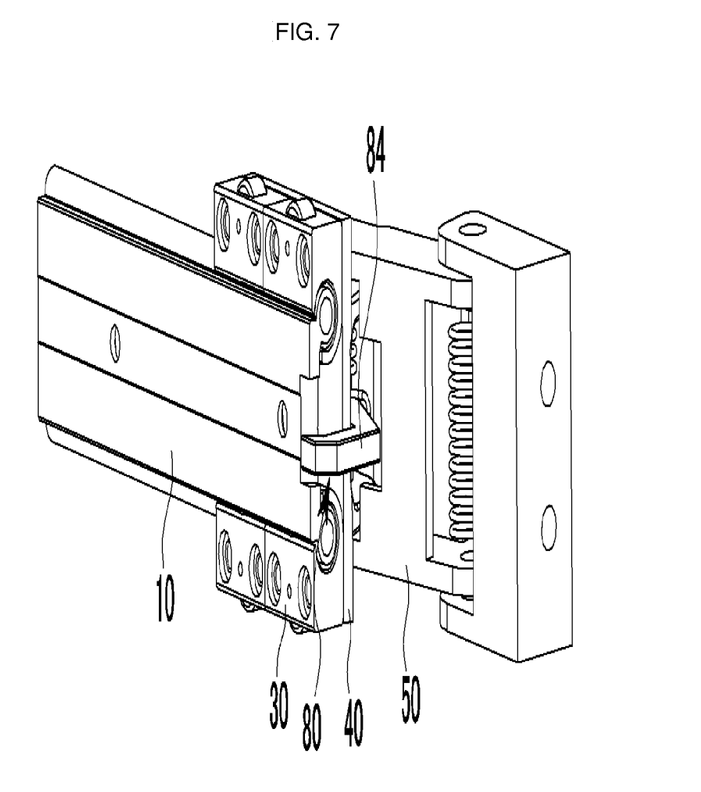
FIG. 7 is a perspective view for showing a state that a hook according to an exemplary embodiment of the present inventive concept is hung and locked on the rail.

Referring to FIG. 7, in a state where the vehicle sliding door 1 closes the door opening of the vehicle body, the hanger 84 of the hook 80 is hung on the central rail 10 mounted on the vehicle sliding door 1 such that the central slider mounting bracket 40, the central slider 30, and the rail 10 are integrally fixed whereby no relative movement occurs therebetween.

Accordingly, the vehicle sliding door 1 and the rail 10 thereof may be maintained to be stably supported by the vehicle body through the central support structure 20.

Figure 8:
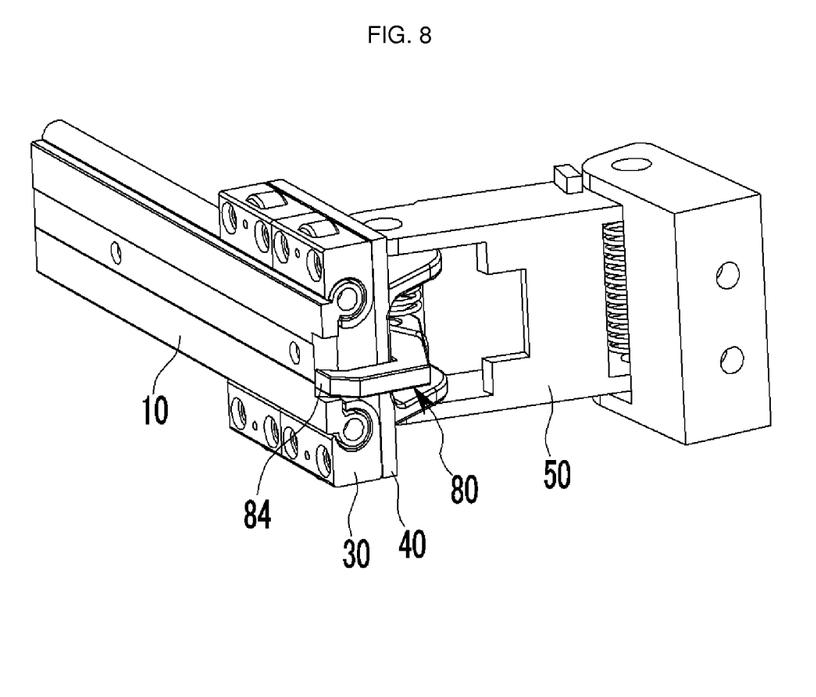
FIG. 8 is a perspective view for showing a state where the hook according to an exemplary embodiment of the present inventive concept is separated from the rail to release the rail.
Figure 9:
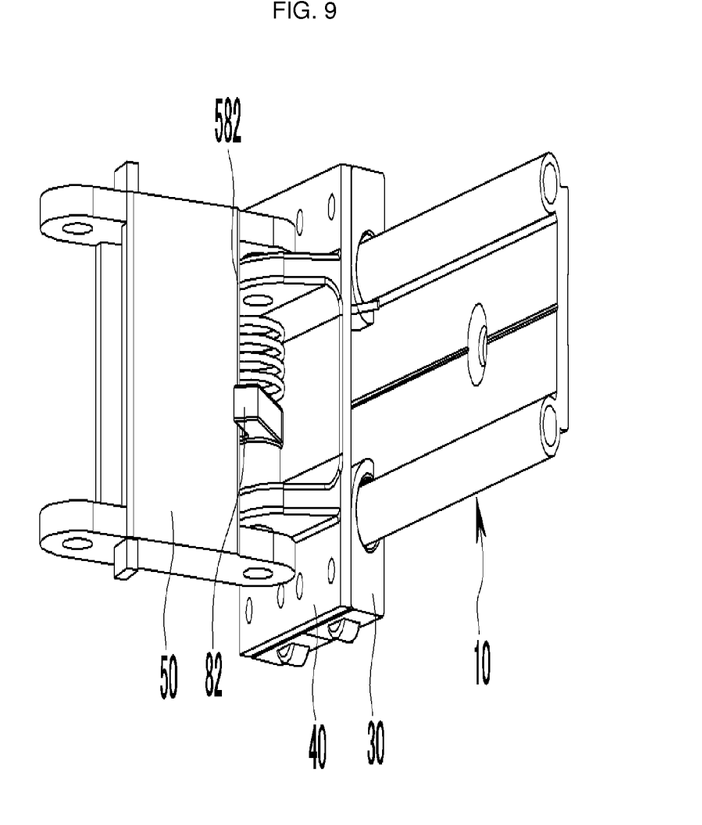
FIG. 9 is a perspective view for showing a state where the hook according to an exemplary embodiment of the present inventive concept is pressed by a swing arm to be separated from and to release the rail.

Referring to FIGS. 8 and 9, if the vehicle sliding door 1 pivots in a direction of opening the door opening of the vehicle body, the swing arm 50 pivots together such that the pressing edge 582 of the swing arm 50 presses and rotates the hook 80. At the time of completion of the pivoting movement of the vehicle sliding door 1, the hanger 84 of the hook 80 is separated from the rail 10, such that the rail 10 and vehicle sliding door 1 may slidingly move back (in a case that the vehicle sliding door is a rear vehicle sliding door) or forth (in a case that the vehicle sliding door 1 is a front vehicle sliding door) in the longitudinal direction of the vehicle while coupled to the central support structure 20.

Referring to FIGS. 1 to 3, in a state that the vehicle sliding door 1 closes the door opening of the vehicle body, the hook 80 is hung on the central rail 10 such that the vehicle sliding door 1 may not be opened.

If user, for example, pulls a door handle in order to open the vehicle sliding door 1, the vehicle sliding door 1 is released from a door latch so that it may be opened in a width direction of the vehicle, but since the hook 80 is still hung at the central rail 10, the vehicle sliding door 1 is not able to slide.

If the vehicle sliding door 1 is pulled to the outside in a width direction by user's operation force, the swing arm 50 of the central support structure 20 is pivoted. The hook 80 is pressed and rotated by the swing arm 50 such that the mutual restraint of the central slider 30 and the central rail 10 is released. At this state, if user pushes the vehicle sliding door 1 forward or backward along the longitudinal direction of the vehicle, the central slider 30 moves along the central rail 10 such that the vehicle sliding door 1 opens fully the door opening with sliding movement.

In a state that the vehicle sliding door 1 is fully opened, the vehicle sliding door 1 may maintain its opened state through the door latch. Furthermore, if the door latch is released by user's operation force, the vehicle sliding door 1 may be slidingly moved forward or backward along the longitudinal direction of the vehicle to close and seal the door opening. In a state where the vehicle sliding door 1 closes and seals the door opening, the hook 80 is hung on the central rail 10 whereby the sliding movement of the vehicle sliding door 1 is restrained.

While this inventive concept has been described in connection with what is presently considered to be multiple practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A locking device for a vehicle sliding door, comprising:
   a rail mounted on the vehicle sliding door;
   a central support structure coupled to the rail and mounted on the vehicle body and configured to connect the vehicle sliding door to the vehicle body and to allow the vehicle sliding door to pivot and slide; and a hook disposed on the central support structure and configured to lock the central support structure with respect to the rail when the vehicle sliding door is closed, wherein:

the rail comprises:
- a rail body having a substantially rectangular shape;
- an upper guide rail that extends along an upper edge of the rail body; and
- a lower guide rail that extends along a lower edge of the rail body, wherein the upper guide rail and the lower guide rail protrude from the rail body in a direction perpendicular to the rail body;

the central support structure comprises an upper pair of central sliders disposed on the upper guide rail and a lower pair of central sliders disposed on the lower guide rail, such that the upper pair of central sliders and the lower pair of central sliders are mounted on a central slider mounting bracket; a vehicle body mounting bracket mounted on the vehicle body; and a swing arm having a first end rotatably coupled to the vehicle body mounting bracket and a second end rotatably coupled to the central slider mounting bracket, and the swing arm comprises an upper swing arm disposed on an upper portion of the swing arm; a lower swing arm disposed on a lower portion of the swing arm; and two flanges of a substantially rectangular shape each connecting the upper swing arm and the lower swing arm, one of the flanges having a pressing edge for pressing down and pivoting the hook.

2. The locking device for a vehicle sliding door of claim 1, wherein the upper guide rail and the lower guide rail each have a circular cross-section.

3. The locking device for a vehicle sliding door of claim 1, wherein:
- a first penetrating assembling hole is formed on the upper swing arm;
- a second penetrating assembling hole is formed on the lower swing arm; and
- two engaging flanges are disposed on the central slider mounting bracket and rotatably coupled to the upper swing arm and the lower swing arm.

4. The locking device for a vehicle sliding door of claim 1, wherein:
- the vehicle body mounting bracket has a substantially "U"-shaped cross-section and comprises an upper surface flange, a lower surface flange, and a side surface flange connecting the upper surface flange and the lower surface flange;
- the side surface flange is mounted to the vehicle body; and
- the swing arm is disposed between the upper surface flange and the lower surface flange and rotatably engaged with the upper surface flange and the lower surface flange via pins.

5. The locking device for a vehicle sliding door of claim 1, wherein an elastic spring is disposed between the vehicle body mounting bracket and the swing arm, the elastic spring returning the swing arm to a swing arm original position after the swing arm has been pivoted.

6. The locking device for a vehicle sliding door of claim 1, wherein:
- the hook comprises a hook body; a hanger formed on an end of the hook body and configured to be releasably attached to the rail; and a boss that protrudes from the hook body, wherein pins can be inserted into the boss; and
- the hook is rotatably coupled to the swing arm and the central slider mounting bracket.

7. The locking device for a vehicle sliding door of claim 6, further comprising an elastic spring configured to return the hook to a hook original position.

* * * * *